US009508251B1

(12) United States Patent
Byrne et al.

(10) Patent No.: US 9,508,251 B1
(45) Date of Patent: Nov. 29, 2016

(54) SEASONAL SWITCH FOR REMOTE CONTROLS

(71) Applicants: Brendan Byrne, Germantown, TN (US); James Burns, Memphis, TN (US)

(72) Inventors: Brendan Byrne, Germantown, TN (US); James Burns, Memphis, TN (US)

(73) Assignee: HKC-US, LLC, Memphis, TN (US)

( * ) Notice: Subject to any disclaimer, the term of this patent is extended or adjusted under 35 U.S.C. 154(b) by 145 days.

(21) Appl. No.: 14/053,106

(22) Filed: Oct. 14, 2013

Related U.S. Application Data

(60) Provisional application No. 61/732,172, filed on Nov. 30, 2012.

(51) Int. Cl.
*G05B 11/01* (2006.01)
*G08C 17/02* (2006.01)

(52) U.S. Cl.
CPC .................................... *G08C 17/02* (2013.01)

(58) Field of Classification Search
CPC ..... G08C 19/18; F04D 7/007; F04D 25/088; F04D 27/004
USPC ................................ 340/3.4, 3.71, 4.3, 12.2
See application file for complete search history.

(56) References Cited

U.S. PATENT DOCUMENTS

| | | | | |
|---|---|---|---|---|
| 2,464,184 | A | 3/1949 | Pearce | |
| 4,056,699 | A | 11/1977 | Jordan | |
| 4,131,870 | A | 12/1978 | Hilgendorf | |
| 4,247,747 | A | 1/1981 | Swatten | |
| D270,806 | S | 10/1983 | Notbohm | |
| 4,413,211 | A | 11/1983 | Fowler | |
| 4,515,538 | A | 5/1985 | Shih | |
| 4,592,144 | A | 6/1986 | Tolbert | |
| 4,631,377 | A | 12/1986 | Imazeki | |
| 4,818,920 | A | 4/1989 | Jacob | |
| D301,869 | S | 6/1989 | Schwartz | |
| D307,743 | S | 5/1990 | Pierce | |
| 5,041,825 | A | 8/1991 | Hart | |
| 5,189,412 | A * | 2/1993 | Mehta | G05B 19/108 340/12.24 |
| D348,435 | S | 7/1994 | Farinelli | |
| D350,531 | S | 9/1994 | Tsuji | |
| 5,528,229 | A * | 6/1996 | Mehta | 340/3.4 |
| 5,541,584 | A | 7/1996 | Mehta | |
| D402,270 | S | 12/1998 | Garrity | |
| D412,155 | S | 7/1999 | Gatchell | |
| D429,699 | S | 8/2000 | Davis | |
| 6,120,262 | A | 9/2000 | McDonough | |
| D458,906 | S | 6/2002 | Kim | |
| D520,987 | S | 5/2006 | Tyson | |
| D523,001 | S | 6/2006 | Hussaini | |
| D532,778 | S | 11/2006 | Hussaini | |

(Continued)

*Primary Examiner* — Hai Phan
*Assistant Examiner* — Royit Yu
(74) *Attorney, Agent, or Firm* — Brian S. Steinberger; Law Offices of Brian S. Steinberger, P.A.

(57) ABSTRACT

Controls, devices, systems, and methods for remotely reversing ceiling fan rotation directions based on seasonal appearing indicia controls, and remotely selecting ceiling fan turn off times when the user falls asleep. Cooler weather indicia for a remote control reverse switch can include snowflake symbol and/or the types of seasonal weather indicators such as for winter time use. Warmer weather indicia for a remote control reverse switch can include a sun symbol and/or other types of seasonal weather conditions, such as for summer time. Sleep timer controls, such as buttons for 2 hours, 4 hours and 8 hours, allows the user to preset when the fan is to be turned off after the user decides to go to sleep.

18 Claims, 5 Drawing Sheets

(56) References Cited

U.S. PATENT DOCUMENTS

| | | | |
|---|---|---|---|
| D534,131 S | 12/2006 | Ng | |
| D542,236 S | 5/2007 | Klein | |
| D572,206 S | 7/2008 | Ikeda | |
| D595,241 S | 6/2009 | Nishiyama | |
| D599,337 S | 9/2009 | Miles | |
| D601,512 S | 10/2009 | Valoz | |
| D614,589 S | 4/2010 | Altonen | |
| 7,710,237 B2 | 5/2010 | Kato | |
| D629,766 S | 12/2010 | Stepanian | |
| D632,263 S | 2/2011 | Lin | |
| 7,978,565 B2 * | 7/2011 | Coffaro | G04F 1/005 368/109 |
| D647,067 S | 10/2011 | Kim | |
| 8,044,316 B2 | 10/2011 | Ito | |
| D652,392 S | 1/2012 | Duckworth | |
| D653,221 S | 1/2012 | Kashimoto | |
| 8,158,901 B2 | 4/2012 | Fan | |
| 8,299,381 B2 | 10/2012 | Hamel | |
| D672,727 S | 12/2012 | McCullar | |
| D678,849 S | 3/2013 | McCullar | |
| D680,972 S | 4/2013 | Hunter | |
| 8,441,155 B2 | 5/2013 | Simard | |
| D683,739 S | 6/2013 | Glassman | |
| 8,536,478 B2 | 9/2013 | Li | |
| 8,653,701 B2 * | 2/2014 | Lai | 307/116 |
| 8,664,554 B2 | 3/2014 | Iordache | |
| D702,648 S | 4/2014 | Ichio | |
| D703,156 S | 4/2014 | Parsons | |
| D703,228 S | 4/2014 | Abratowski | |
| 8,785,798 B2 | 7/2014 | Gao | |
| D729,180 S | 5/2015 | Byrne | |
| D729,181 S | 5/2015 | Byrne | |
| 2002/0053981 A1 * | 5/2002 | Van Ryzin | G08C 19/28 340/13.24 |
| 2003/0103165 A1 * | 6/2003 | Bullinger et al. | 348/569 |
| 2003/0157883 A1 * | 8/2003 | Kwak | 454/258 |
| 2005/0105751 A1 * | 5/2005 | Arz et al. | 381/315 |
| 2005/0224332 A1 | 10/2005 | Yamaguchi | |
| 2006/0106559 A1 * | 5/2006 | Lerch | 702/94 |
| 2009/0140064 A1 * | 6/2009 | Schultz et al. | 236/51 |
| 2010/0070086 A1 * | 3/2010 | Harrod | F24F 11/0086 700/276 |
| 2010/0154238 A1 * | 6/2010 | Harshbarger | G01B 7/26 33/836 |
| 2010/0155215 A1 | 6/2010 | Zuo | |
| 2011/0031819 A1 * | 2/2011 | Gunwall | 307/141.4 |
| 2011/0035774 A1 * | 2/2011 | Parker | 725/40 |
| 2012/0024683 A1 | 2/2012 | Prohofsky | |
| 2012/0127075 A1 | 5/2012 | Kholaif | |
| 2012/0306771 A1 | 12/2012 | Chen | |
| 2013/0335348 A1 | 12/2013 | Nam | |

* cited by examiner

SEASONAL SWITCH FOR REMOTE CONTROLS

CROSS REFERENCE TO RELATED APPLICATIONS

This invention claims the benefit of priority to U.S. Provisional Patent Application Ser. No. 61/732,172 filed Nov. 30, 2012, and is a Continuation In Part of U.S. Design patent application Ser. No. 29/456,050 filed May 28, 2013. The entire disclosure of each of the applications listed in this paragraph are incorporated herein by specific reference thereto.

FIELD OF INVENTION

This invention relates to remote controls, and in particular to controls, devices, systems, and methods for remotely reversing fan rotation directions, such as those on ceiling fans, based on seasonal appearing indicia controls, and remotely selecting ceiling fan turn off times when the user falls asleep.

BACKGROUND AND PRIOR ART

Many consumers do not realize that ceiling fans perform different functions depending on the season and actually turn off their ceiling fans during non warm weather conditions, such as during the winter time. Most consumers will operate their fans in warmer months such as during the summer to push air downward. However, most of these same consumers will actually turn off the fans entirely during the winter months, since they do not understand that ceiling fans generally have reverse controls for allowing the fan to rotate both clockwise or counterclockwise.

It is generally unclear to most consumers as to how and when to use the reverse function of the fan. Consumers generally do not understand why there is a reverse function at all and when to use it. Additionally, reverse controls are generally located on the fan motor, which makes it difficult for the user to operate, without using a ladder to reach the fan.

Most fans generally work based on an ON switch or an OFF switch. As such, there are generally no automatic shutoff controls that allow the consumer to automatically turn off their fans after they fall asleep. For example, if a consumer goes to sleep with the fan running when the weather is warm, and it becomes noticeably cooler at night, the consumer has to awake and manually turn off the fan during the night.

Thus, the need exists for solutions to the above problems with the prior art.

SUMMARY OF THE INVENTION

A primary objective of the present invention is to provide controls, devices, systems, and methods for remotely reversing fan rotation direction based on seasonal controls.

A secondary objective of the present invention is to provide controls, devices, systems, and methods for providing visual references on a remote control to make the correct use of the reverse function control on a fan direction control intuitive to the user.

A third objective of the present invention is to provide controls, devices, systems, and methods for remotely selecting fan turn off times when the user falls asleep.

A remote control for fans, comprising a portable housing having a reverse motor control with a first position for rotating the fan in a first rotational direction to push airflow downward, and a second position for reversing operation of the fan to rotate the fan in a second rotational direction opposite to the first rotational direction to pull airflow upward, a first seasonal indicia indicator for on the reverse motor control for the first position, and a second seasonal indicia indicator on the reverse motor control for the second position, wherein the first seasonal indicia indicator and the second seasonal indicia indicator are not limited to a reverse indicia indicator.

The reverse motor control on the portable housing can include a slidable switch having a slightly raised roughened upper surface portion for being slid from the first position to the second position and back.

The first seasonal indicia can include a cooler weather indicating indicia symbol, and the second seasonal indicia includes a warmer weather indicating indicia symbol.

The cooler weather indicating indicia symbol can be selected from at least one of a snowflake, ski cap, scarf, ice, snowman, and thermometer with low temperature reading, and the warmer weather indicating indicia symbol is selected from at least one of sun, sunglasses, bathing suits, sweat, and thermometers with high temperatures The cooler weather indicating indicia symbol, can include the snowflake, and the warmer weather indicating indicia symbol can include the sun.

The cooler weather indicating indicia symbol can include winter indicia, and the warmer weather indicating indicia symbol can include summer indicia.

The remote control can include a sleep timer control having at least two settings for turning off the fan at preselected times. The sleep timer can include three settings for turning off the fan at three preselected times.

The remote control can include push buttons for each of the settings. The three preselected settings can include 2 hours, 4 hours and 8 hours. The three preselected settings can includes indicia of 2 H, 4 H and 8 H, and/or can include clock indicating indicia with or without hour and minute hands, and the like.

The reverse motor control on the portable housing can include a slidable switch having a slightly raised roughened upper surface portion for being slid from the first position to the second position and back.

The portable housing can be used as a remote control for a ceiling fan.

The remote control can include a portable housing having a sleep timer control having at least two settings for turning off the fan at preselected times, and separate switches on the portable housing for activating the settings for turning off the fan at preselected times Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

Figure 3:
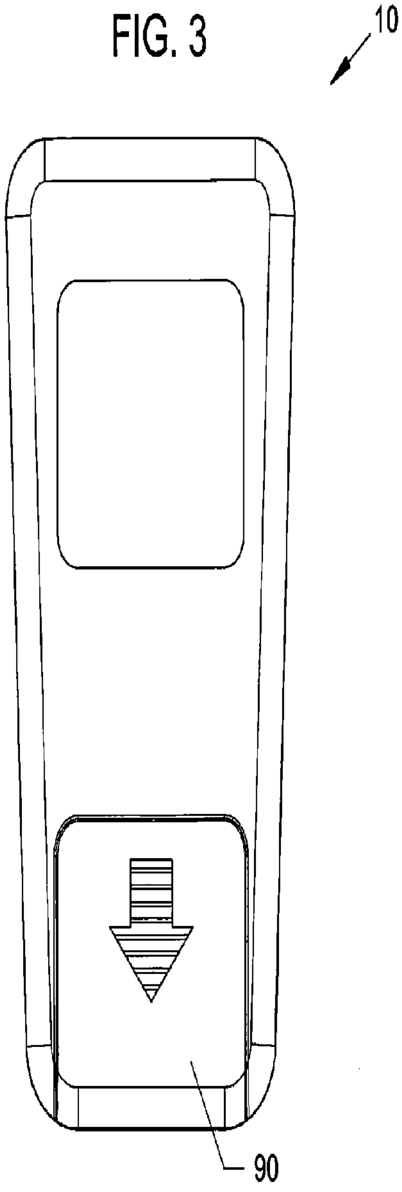
FIG. 3 is a back view of the remote control of FIG. 1.
Figure 4:
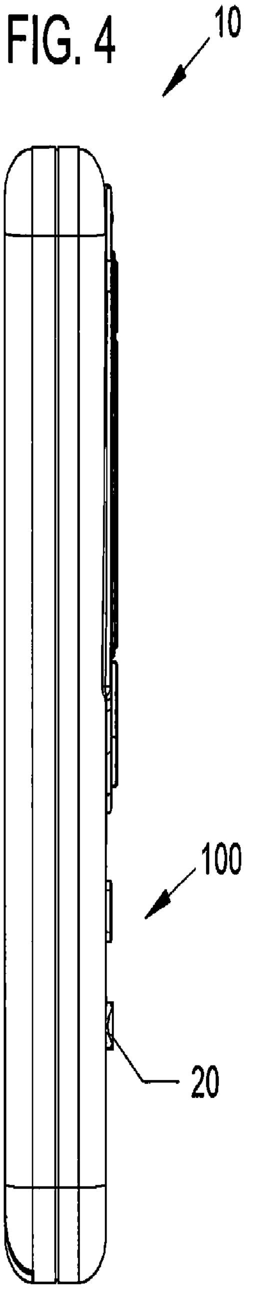
FIG. 4 is a left side view of the remote control of FIG. 1.

10 Ceiling fan remote control with seasonal switch.
20 Seasonal selector slide switch.
30 Winter switch icon.
40 Summer switch icon.
50. Speed control
54. Fan On/Off
58. Variable breeze control
60. Random light control
70. Light On/Off
80. Delayed Light Off
90. Battery compartment
100. Sleep timer control switches
110. 2 hour timer control button switch
120. 4 hour timer control button switch
130. 8 hour timer control button switch The invention can use a remote control 20 to control various functions of a ceiling fan. On and off and reverse operations of ceiling fans with limited timer activation are shown and described in FIG. 3 of U.S. Pat. FIG. 4 of U.S. Pat. No. 4,515,538 to Shih; U.S. Pat. No. 4,818,920 to Jacob; U.S. Pat. No. 5,041,825 to Hart et al.; FIG. 4 of U.S. Pat. No. 4,515,538 to Shih; and U.S. Pat. No. 5,164,644 to Hsieh, each of which is incorporated by reference, in their entirety.

Figure 1:
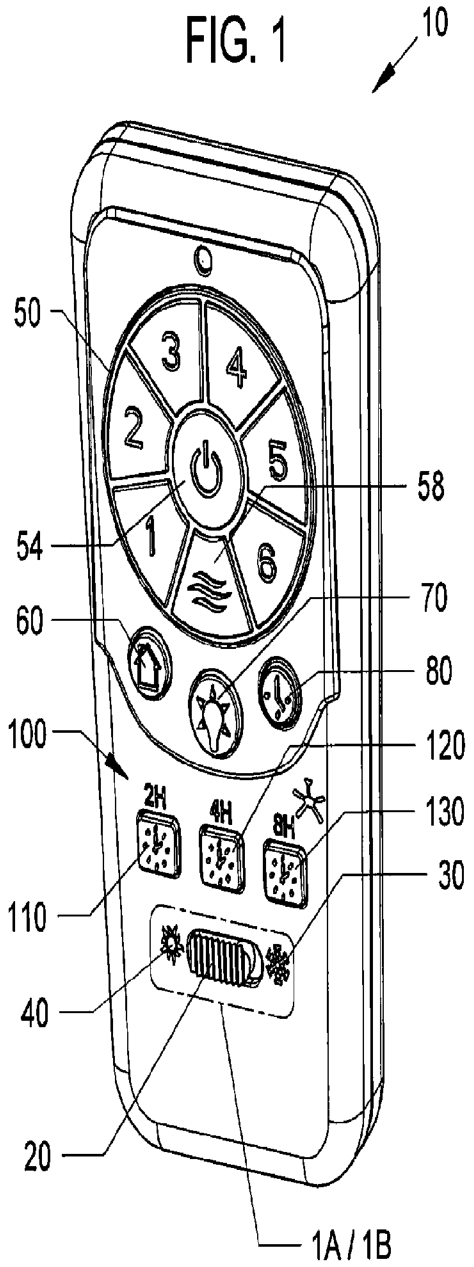
FIG. 1 is a front perspective view of a novel portable remote control with seasonal sliding switch and push button switches for different sleep timer settings.

FIG. 1 is a front perspective view of a novel portable remote control 10 with seasonal sliding switch 20 and push button switches 100 for different sleep timer settings.

Figure 1A:
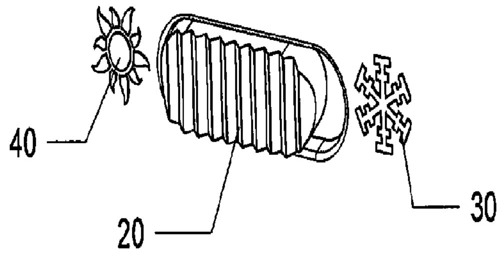
FIG. 1A is an enlarged view of the seasonal switch of FIG. 1 set to the warm weather conditions.
Figure 1B:
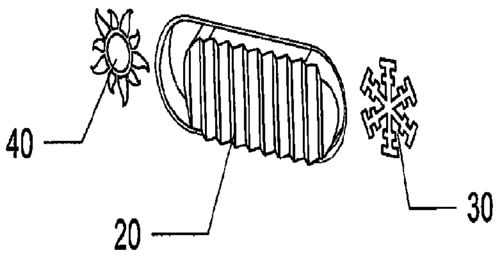
FIG. 1B is an enlarged view of the seasonal switch of FIG. 1 set to the cooler weather conditions.

FIG. 1A is an enlarged view of the seasonal slide switch 20 of FIG. 1 slid left and set to the warm weather conditions. FIG. 1B is an enlarged view of the seasonal slide switch 20 of FIG. 1 slid right and set to the cooler weather conditions.

Figure 2:
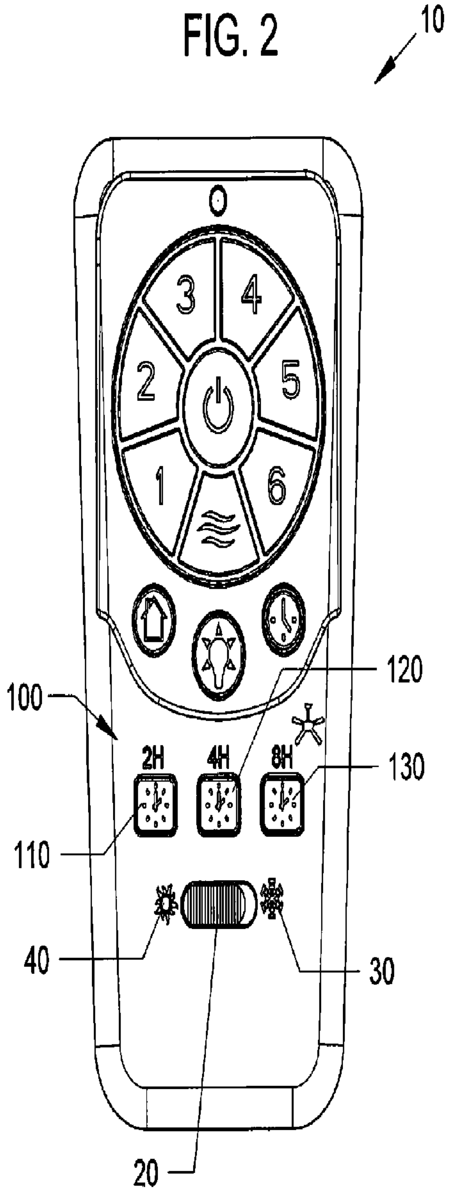
FIG. 2 is a front view of the remote control of FIG. 1.
Figure 5:
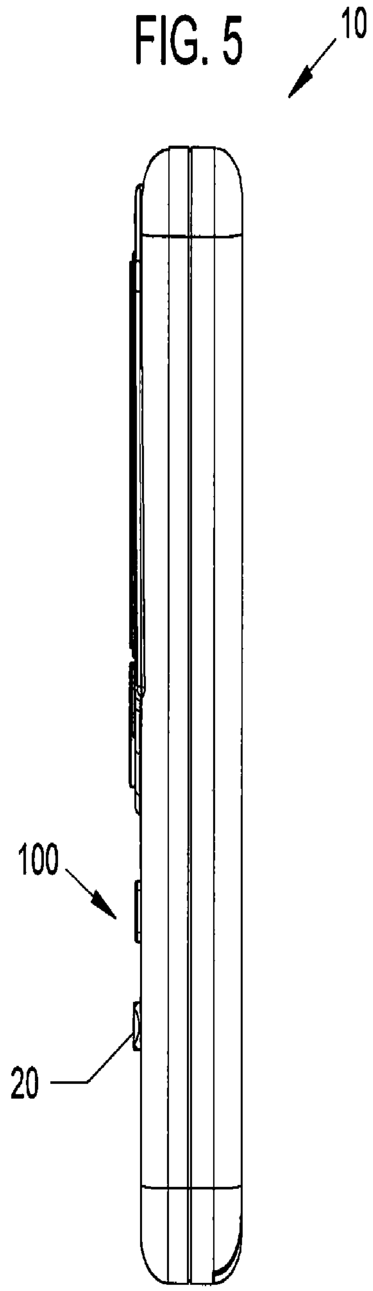
FIG. 5 is a right side view of the remote control of FIG. 1.
Figure 6:
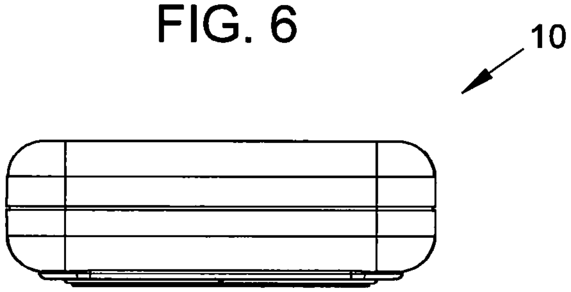
FIG. 6 is a top view of the remote control of FIG. 1.
Figure 7:
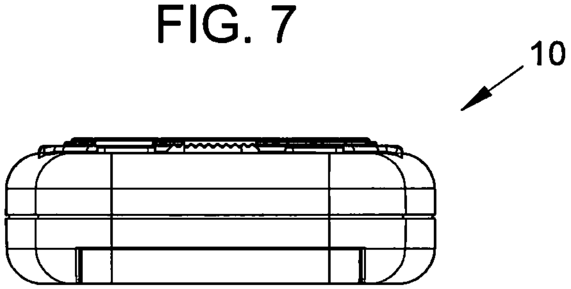
FIG. 7 is a bottom view of the remote control of FIG. 1.
Figure 8:
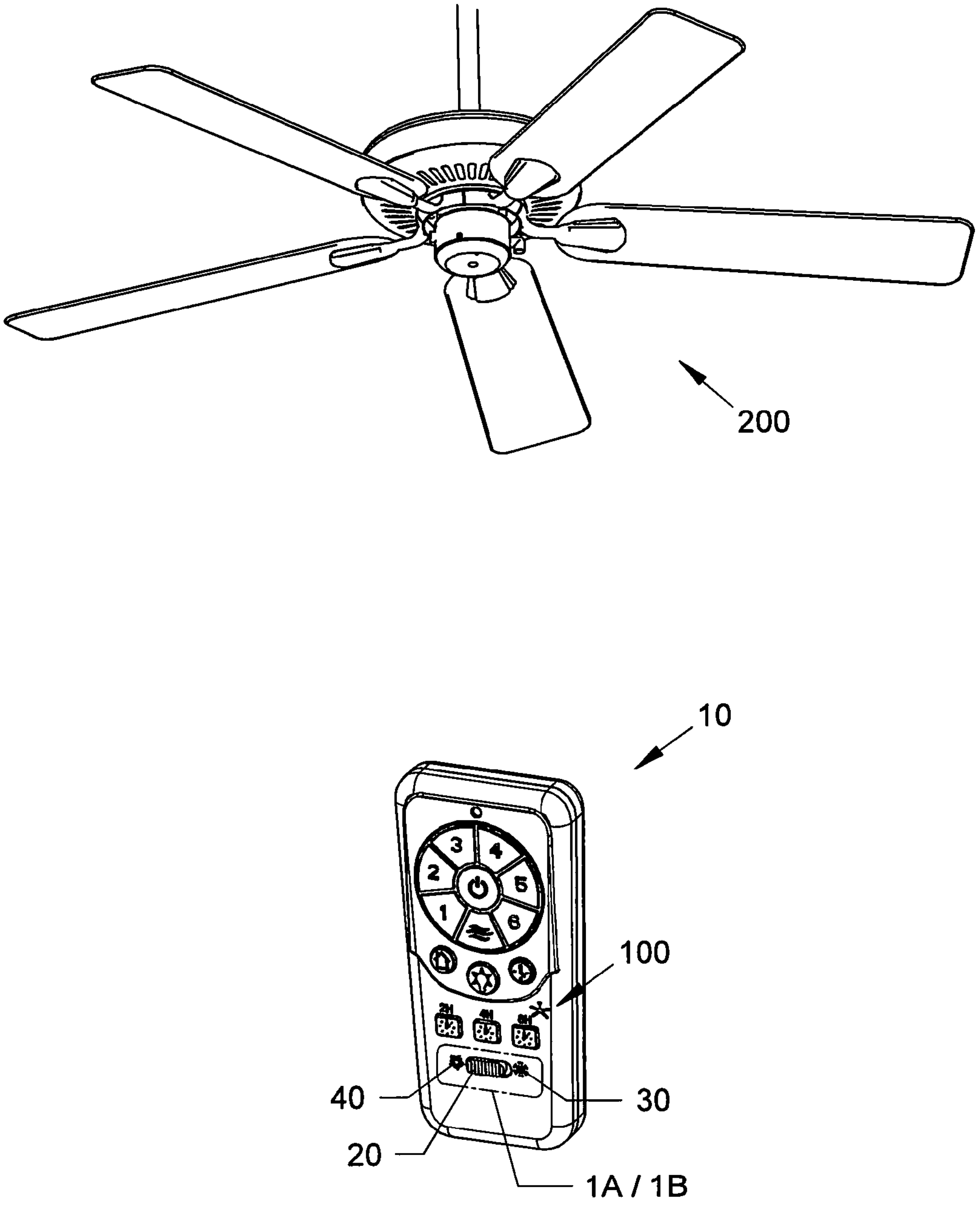
FIG. 8 is a perspective view of the portable remote control used with a ceiling fan.

FIG. 2 is a front view of the remote control 10 of FIG. 1. FIG. 3 is a back view of the remote control 10 of FIG. 1. FIG. 4 is a left side view of the remote control 10 of FIG. 1. FIG. 5 is a right side view of the remote control 10 of FIG. 1. FIG. 6 is a top view of the remote control 10 of FIG. 1. FIG. 7 is a bottom view of the remote control 10 of FIG. 1. FIG. 8 is a perspective view of the portable remote control 10 used with a ceiling fan 200.

Referring to FIGS. 1-8, the remote control 10 can be used with controlling functions on a ceiling fan 200. The remote control 10 can include speed control buttons 50 to remotely select fan speed between 1(low) and up to 6(high). Push button 54 can be used to turn fan off or turn fan on at most recently selected speed. Press and hold button 54 to turn off or on the sounds from the remote control 10. Press button 58 is a variable breeze control when activated causes the fan to simulate a natural breeze, as if one were outside. Press any speed control button 50 can exit this mode.

Button 60 can be a random light mode. When pressed, a light on the fan 200 can blink twice to confirm the Random Light mode. The Lights on the fan 200 can cycle on for 5-20 minutes and off for 60 minutes simulating occupancy. The cycle can repeat continuously until any other button is pushed to discontinue Random Light mode.

Light On/Off button 70 can cycle lights on the fan 200 on and off. Button 80 can be a delayed off switch that turns off light 1 minute after being depressed so that the user can exit a room.

Battery compartment 90 can house removable batteries, such as a 12 volt battery to operate control 20.

Referring to FIGS. 1-8, the seasonal slide switch 20 is a low profile sliding switch with a rough upper edge surface. Sliding switch 20 changes direction of blade rotation of the fan 200. For warm weather, sliding the switch to the left, and for cool weather slide the switch 20 to the right.

The seasonal switch 20 makes it clear to consumers which direction the ceiling fan should run for each season. In the summertime, the fan should blow air down providing a wind chill effect on the skin. In the winter months, the ceiling fan should blow the air up to push the hot stagnant air from the ceiling and prevent cold spots in the room.

The invention differs from what currently exists. The seasonal switch 20 remote clearly shows the consumer how to run the fan in the appropriate direction.

Since the consumer does not understand the reverse switch on the fan, they do not use this switch in the winter months.

By making visual references on the remote control 20, for example, a sun symbol 40 for summer and a snowflake symbol 30 for winter, the seasonal sliding switch 20 makes the correct use of the reverse function of the ceiling fan very intuitive.

The seasonal switch 20 works with the motor in the ceiling fan 200 to insure that the ceiling fan 200 is blowing in the correct direction for each season.

While the seasonal indicia shows a sun symbol 40 for warm weather conditions, such as but not limited to the summer, and a snowflake symbol 30 for cooler/cold weather conditions, such as but not limited to the winter, other symbols, can be used. For example, indicia symbols, such as but not limited to sunglasses, persons in bathing suits, sweating, thermometers with high temperatures, and the like can be used for warm weather conditions. For example, indicia symbols, such as but not limited to ski caps, scarfs, ice, snowman, thermometers with low temperatures, and the like can be used for cold weather conditions. In addition, terms such as “winter” and “summer”, can also be used with or without the seasonal indicia indicators.

Referring to FIGS. 1-8, novel sleep timer switches 100 can be used. Push button switch 110 having a 2 H indicia symbol can be activated by the user to automatically turn off the fan 200 approximately 2 hours after the user goes to the sleep. Push button switch 120 can a 4 H indicia symbol can be activated by the user to automatically turn off the fan 200 approximately 4 hours after the user goes to sleep. Push button switch 130 can be activated by the user to automatically turn off the fan 200 approximately 8 hours after the user goes to sleep.

Other types of indicial symbols for the sleep timer can be used such as but not limited to clock symbols with hour hands, minute hands, and the like.

Although the remote controls are generally described for use with ceiling fans, the invention can be used as a remote control for other types of fans, such as but not limited to wall mounted fans, table fans, floor fans, air conditioning fans, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A remote control for ceiling fans with lights, comprising:

a portable housing having a reverse motor control with a first position for rotating a ceiling fan in a room, in a first rotational direction to push airflow downward, and a second position spatially different than the first position for reversing operation of the fan to rotate the fan in a second rotational direction opposite to the first rotational direction to pull airflow upward, the reverse motor control consisting of: an elongated slidable switch having a slightly raised roughened upper surface portion with a plurality of parallel ridges for being slid from the first position to the second position and back, and a first seasonal indicia illustration on the reverse motor control fixed adjacent to the first position, wherein the first seasonal illustration consists of a cooler weather indicating nontext indicia symbol, and a second seasonal indicia illustration on the reverse motor control fixed adjacent to the second position, wherein the second seasonal illustration consists of a warmer weather indicating nontext indicia symbol, wherein the first seasonal indicia illustration of a cooler weather indicating nontext indicia symbol and the second seasonal indicia illustration of a warmer weather indicating nontext indicia symbol are not limited to a reverse indicia illustration, a sleep timer control having at least two settings each setting having a separate switch consisting of turning off the fan after a preselected different time duration adapted for when a user goes to sleep, speed controls for remotely selecting different fan speeds for rotating the fan, variable breeze control to simulate a natural breeze when rotating the fan, random light mode to continuously cycle a fan light on and off for a selected time to simulate occupancy in the room, and a delay off control which delays turning off the fan light after a selected time to allow a user to exit the room.

2. The remote control of claim 1, wherein the cooler weather indicating indicia symbol, is selected from at least one of a snowflake, ski cap, scarf, ice, snowman, and thermometer with low temperature reading, and the warmer weather indicating indicia symbol is selected from at least one of sun, sunglasses, bathing suits, sweat, and thermometers with high temperatures.

3. The remote control of claim 2, wherein the cooler weather indicating indicia symbol, includes the snowflake, and the warmer weather indicating indicia symbol includes the sun.

4. The remote control of claim 1, wherein the cooler weather indicating indicia symbol includes winter indicia, and the warmer weather indicating indicia symbol includes summer indicia.

5. The remote control of claim 1, wherein the sleep timer control consists of three separate switches, each switch for turning off the fan after three different preselected time durations.

6. The remote control of claim 1, wherein the switches include push buttons for each of the settings.

7. The remote control of claim 5, wherein the three different preselected settings includes 2 hours, 4 hours and 8 hours.

8. The remote control of claim 7, wherein the three preselected settings includes three push buttons.

9. The remote control of claim 7, wherein the three preselected settings includes indicia of 2 H, 4 H and 8 H.

10. A remote control for ceiling fans with lights, consisting of:

a portable housing having a sleep timer control having at least two settings, each setting having a separate switch consisting of turning off a ceiling fan at different preselected times, adapted for when a user goes to sleep;

a reverse motor control with a first position to rotate the fan in a first rotational direction to push airflow downward, and a second position spatially different than the first position for reversing operation of the fan to rotate the fan in a second rotational direction opposite to the first rotational direction to pull airflow upward, the reverse motor control consisting of an elongated slidable switch having a slightly raised roughened upper surface portion with a plurality of raised parallel ridges for being slid from the first position to the second position and back, and a first seasonal indicia illustration on the reverse motor control fixed adjacent to the first position, wherein the first seasonal illustration consists of a cooler weather indicating nontext indicia symbol, and a second seasonal indicia illustration on the reverse motor control fixed adjacent to the second position, wherein the second seasonal illustration consists of a warmer weather indicating nontext indicia symbol, wherein the first seasonal indicia illustration and the second seasonal indicia illustration are not limited to a reverse indicia illustration, a sleep timer control having at least two settings each setting having a separate switch consisting of turning off the fan after a preselected different time duration adapted for when a user goes to sleep, speed controls for remotely selecting different fan speeds for rotating the fan, variable breeze control to simulate a natural breeze when rotating the fan, random light mode to continuously cycle a fan light on and off for a selected time to simulate occupancy in the room, and a delay off control which delays turning off the fan light after a selected time to allow a user to exit the room.

11. The remote control of claim 10, wherein the sleep timer control consists of three switches each having different pre-selected settings for turning off the fan after three different preselected durations of time.

12. The remote control of claim 10, further comprising push buttons for each of the switches.

13. The remote control of claim 11, wherein the three different preselected settings consists of 2 hours, 4 hours and 8 hours.

14. The remote control of claim 13, wherein the three preselected settings includes indicia of 2 H, 4 H and 8 H.

15. A ceiling fan system, comprising in combination:

a ceiling fan motor connected to a power supply a plurality of ceiling fan blades attached to the ceiling fan motor;

a light attached to the ceiling fan motor and connected to the power supply; and a portable remote control for operating the ceiling fan motor and light, the remote control comprising:

a portable housing having a reverse motor control with a first position for rotating the fan blades in a room, in a first rotational direction to push airflow downward, and a second position spatially different than the first position for reversing operation of the fan to rotate the fan blades in a second rotational direction opposite to the first rotational direction to pull airflow upward, the reverse motor control consisting of: an elongated slidable switch having a slightly raised roughened upper surface portion with a plurality of parallel ridges for being slid from the first position to the second position and back, and a first seasonal indicia illustration on the reverse motor control fixed adjacent to the first position, wherein the first seasonal illustration consists of a cooler weather indicating nontext indicia symbol, and a second seasonal indicia illustration on the reverse motor control fixed adjacent to the second position, wherein the second seasonal illustration consists of a warmer weather indicating nontext indicia symbol, wherein the first seasonal indicia illustration of a cooler weather indicating nontext indicia symbol and the second seasonal indicia illustration of a warmer weather indicating nontext indicia symbol are not limited to a reverse indicia illustration, and a sleep timer control having at least two settings each setting having a separate switch consisting of turning off rotating of the fan blades after a preselected different time duration adapted for when a user goes to sleep, and speed controls for remotely selecting different fan speeds for rotating the fan blades, and variable breeze control to simulate a natural breeze when rotating the fan blades, and random light mode to continuously cycle the light on and off for a selected time to simulate occupancy in the room, and a delay off control which delays turning off the light after a selected time to allow a user to exit the room.

16. The remote control of claim 1, wherein the speed controls include:

six speed controls.

17. The remote control of claim 10, wherein the speed controls include:

six speed controls.

18. The ceiling fan system of claim 15, wherein the speed controls include:

six speed controls.

* * * * *